Feb. 7, 1950 R. COCHRAN 2,496,377
LAWN EDGER
Filed June 3, 1948 2 Sheets-Sheet 1
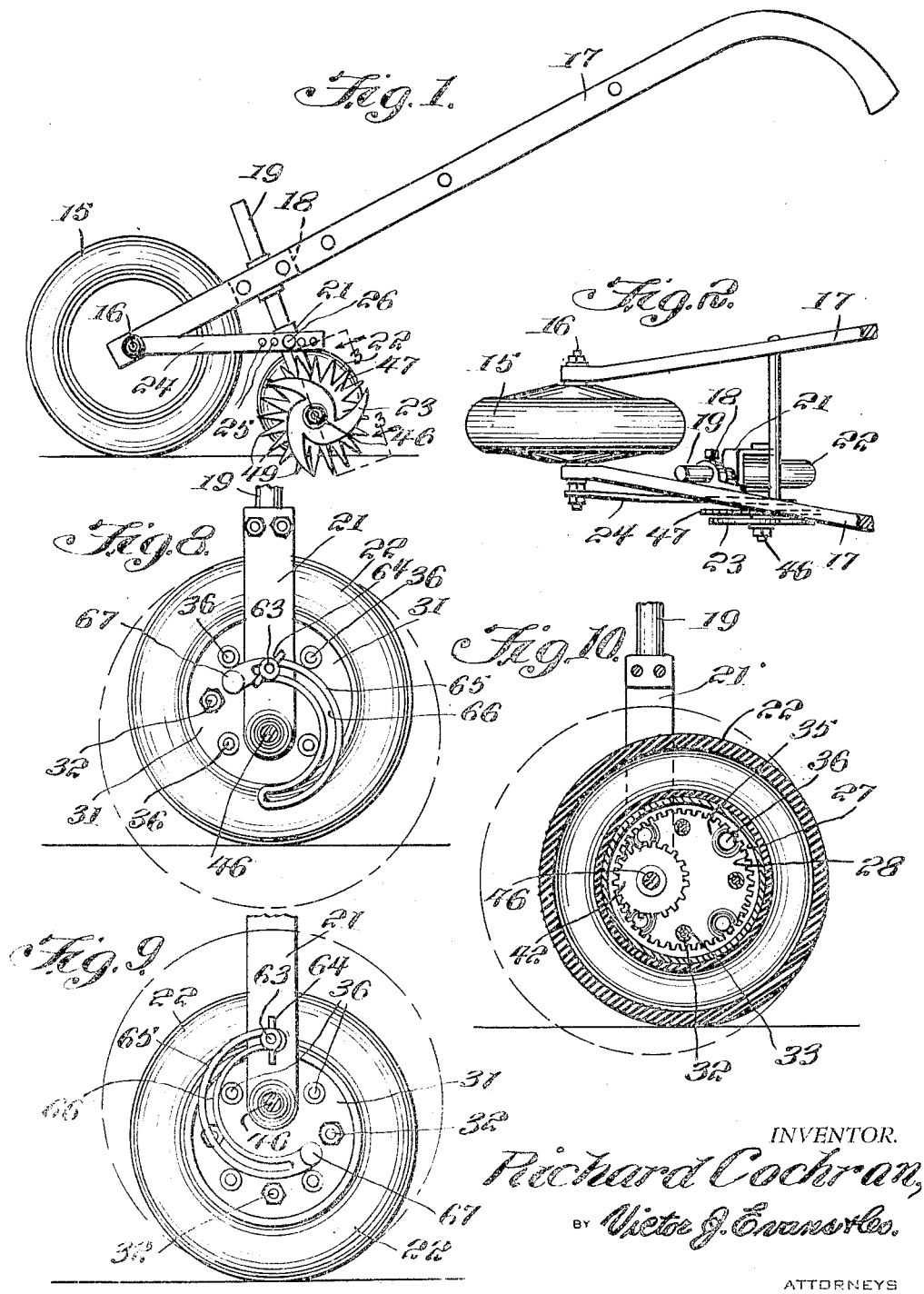
INVENTOR.
Richard Cochran,
BY Victor J. Evans & Co.
ATTORNEYS

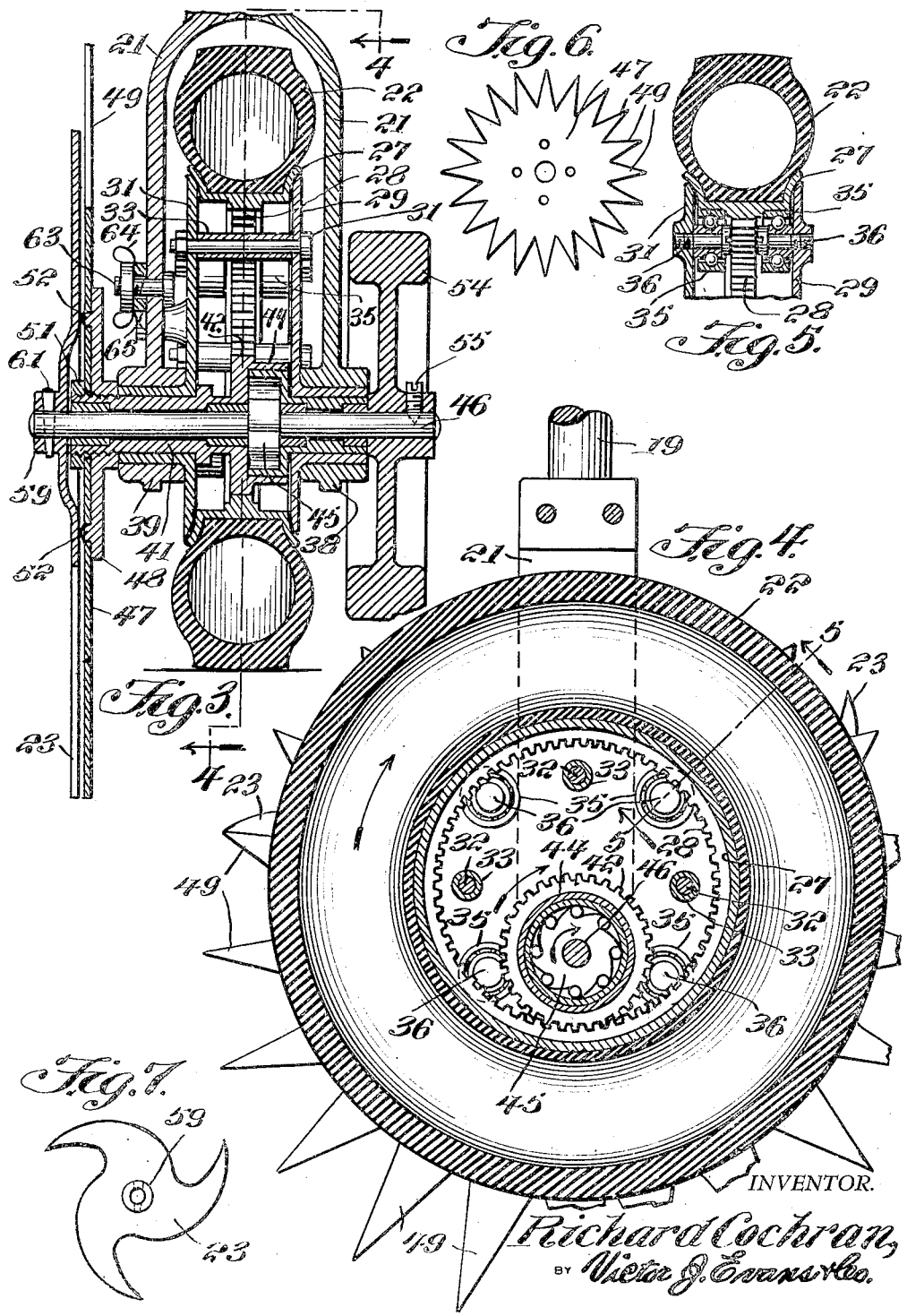

Patented Feb. 7, 1950

2,496,377

UNITED STATES PATENT OFFICE 2,496,377

LAWN EDGER

Richard Cochran, South Gate, Calif.

Application June 3, 1948, Serial No. 30,950

2 Claims. (Cl. 56—256)

This invention relates to a lawn edging device.

It is an object of the present invention to provide a lawn edging device wherein a cutting knife will be continually rotated while the device is being advanced to effect positive cutting action and wherein this cutting knife can be powered from the supporting wheel which is moved along the lawn and wherein there is provided an overrunning clutch and a flywheel for causing the even and continuous rotation of the cutting knife and wherein a simple and effective adjustment for the cutting knife whereby the depth of cut can be regulated or where it can be extended to an out-of-use position is had.

Other objects of the present invention are to provide a lawn edging device wherein the cutting knife is driven at high speed as the device is moved over the lawn, which is of simple construction, inexpensive to manufacture, easy to handle or manipulate over the lawn, easy to adjust for different depth of cuts, rugged and has long life, and efficient in operation.

For other objects and for a better understanding of the invention, reference may be had to the following detailed description taken in connection with the accompanying drawing, in which Fig. 1 is a side elevational view of the lawn edging device embodying the features of the present invention.

Fig. 2 is a fragmentary top plan view of the edging device.

Fig. 3 is an enlarged sectional view taken through the power gearing for driving the knife and the supporting wheel, the view being taken on line 3—3 of Fig. 1.

Fig. 4 is an enlarged longitudinal sectional view taken through the drive mechanism and on line 4—4 of Fig. 3.

Fig. 5 is a fragmentary sectional view taken on line 5—5 of Fig. 4.

Fig. 6 is a plan view of the slow rotating blade.

Fig. 7 is a plan view of the cutting knife which is run at high speed.

Figs. 8 and 9 are respectively side elevational views of the device and of the adjusting mechanism for varying the depth of cut of the device, Fig. 8 illustrating the adjustment when the knife is in the down position and Fig. 9 illustrating the position of the adjusting mechanism when in the raised position.

Fig. 10 is a transverse sectional view of the device showing the internal gearing and illustrating the position of the supporting wheel and of the mechanism when the cutting knife is extended halfway into the ground.

Referring now to the figures, 15 represents a main supporting wheel having an axle 16 to which the opposite sides of a push handle frame 17 is connected. Extending inwardly from one side of the frame is a bracket 18, upwardly through which may be adjusted a shank 19 of a forked member 21 having a driving wheel 22 and mechanism for rotating at high speed cutting knife 23. A pull arm 24 is connected to one end of axle 16 and has a series of holes 25 through which a screw 26 may be extended for fixing the forked member 21 in its adjusted position.

Both the supporting wheel 15 and the driving wheel 22 are of rubber. The driving wheel 22 includes a rim 27 having an internal gear formation 28 thereon. At the opposite sides of the rim 27 and clamped thereto are plates 29 and 31. These plates are retained in clamped positions by bolts 32 extending through sleeves 33. The bolts 32 are circumferentially spaced and between the same are circumferentially disposed ball bearing idler elements 35 secured to the inner faces of the respective plates 29 and 31 by bolts 36. The rim is thus supported upon the rollers and can rotate relative to the plates 29 and 31 and within the peripheries of the same.

The plates 29 and 31 respectively have outwardly extending bearing sleeve portions 38 and 39 which are offset from the center of the plates and which contain a sleeve 41 having a gear formation 42 thereon. This gear formation 42 engages with the internal ring gear formation 28 to be driven by the same. The gear formation 42 has a sleeve 44 projecting from the side of the same for containing an over running clutch device 45 connected to an axle 46 journalled within the sleeve 41 and adapted to be driven at high speed. As the edging device is moved over the ground, sleeve 41 will be rotated and a blade 47 coupled to a flange 48 screw fitted upon the end of the sleeve 41 and having a plurality of blades 49 will be driven. A nut 51 retains the blade 47 against the flange coupling 48 and on driving lugs 52 of the flange.

The shaft connected with the overrunning clutch has a flywheel 54 connected to the same by a set screw 55. This flywheel, when started in motion, will drive the shaft 46 at high speed. On the opposite end of the shaft there is coupled a cutting knife 58 lying adjacent the cutting blade 47. The knife 58 has a hub portion 59 through which a cotter pin 61 may extend for securing the cutting knife 58 to the shaft 46. Accordingly, this cutting knife will be rotated at a higher speed than the cutting blade 47.

The power wheel with the cutting knives thereon are adjustable about their offset connection with the forked member 21 as illustrated in Figs. 8, 9 and 10. On the side of the forked member is a bolt 63 having a winged clamping nut 64 thereon adapted to engage with an arcuate shaped member 65 having a slot 66 in which is disposed the bolt 63. The member 65 is connected by a pivot bolt 67 to plate 31. The wheel 22 can accordingly be adjusted in the fork 21 and retained in its adjusted position by the arcuate member 65 and the clamping nut 64. When the wheel is adjusted, the cutting blades will be either elevated or extended into the ground. The cutting blades can be adjusted to any elevation intermediate the knife down and knife up positions as illustrated in Fig. 10 where the same is disposed halfway into the ground.

It should be apparent that there has been provided an edging device which is powered by a wheel extending along the ground and independently of the supporting wheel for the handle frame which rotates two blades at different speeds, one blade running faster than the other whereby a good edging action is obtained.

While various changes may be made in the detail construction, it shall be understood that such changes shall be within the spirit and scope of the present invention as defined by the appended claims.

I claim:

1. In a lawn edging device, a main supporting wheel, a push handle connected to said supporting wheel, a forked member connected to said handle and extending downwardly therefrom, a power wheel mechanism journalled in said forked member, a pair of parallel cutting blades rotating at different cutting speeds and connected to said power wheel mechanism, said power wheel mechanism including a rim, side plates for rotatably supporting said rim, a sleeve journalled in said side plates, one of said cutting blades being secured to said sleeve, a shaft journalled in said sleeve and connected to the other of said cutting blades, means connecting said rim and sleeve and shaft together, said power mechanism being adjustable whereby said cutting blades can be adjusted to cut at different elevations, and means for maintaining said power mechanism immobile in its adjusted position.

2. The apparatus as described in claim 1 and further including a flywheel connected to said shaft, and an overrun clutch arranged between the sleeve and shaft.

RICHARD COCHRAN.

REFERENCES CITED

The following references are of record in the file of this patent:

UNITED STATES PATENTS

| Number | Name | Date |
|---|---|---|
| 316,937 | Bell | May 5, 1885 |
| 1,054,320 | Slatter | Feb. 25, 1913 |
| 1,489,868 | Wahl | Apr. 8, 1924 |
| 1,970,838 | Buettner | Aug. 21, 1934 |
| 1,991,305 | Willits | Feb. 15, 1935 |

FOREIGN PATENTS

| Number | Country | Date |
|---|---|---|
| 26,403 | Great Britain | Nov. 18, 1913 |
| 496,570 | Great Britain | May 31, 1937 |